US012584603B2

(12) United States Patent
Bushre et al.

(10) Patent No.: US 12,584,603 B2
(45) Date of Patent: Mar. 24, 2026

(54) VEHICLE HEADLIGHT ASSEMBLY WITH PCB-MOUNTED SHIELD

(71) Applicant: Autosystems, a division of Magna Exteriors Inc, Aurora (CA)

(72) Inventors: Adam L. Bushre, Novi, MI (US); Gaurav Bhutani, Whitby (CA); Patrick J. Stuart, Belleville (CA); Rafat Mohammad, Dearborn, MI (US)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/886,496

(22) Filed: Sep. 16, 2024

(65) Prior Publication Data

US 2025/0122986 A1 Apr. 17, 2025

Related U.S. Application Data

(60) Provisional application No. 63/557,015, filed on Feb. 23, 2024, provisional application No. 63/543,840, filed on Oct. 12, 2023.

(51) Int. Cl.

| | |
|---|---|
| ***F21S 41/43*** | (2018.01) |
| ***F21S 41/143*** | (2018.01) |
| ***F21S 41/153*** | (2018.01) |
| ***F21S 41/255*** | (2018.01) |
| ***F21S 41/47*** | (2018.01) |
| ***F21S 41/65*** | (2018.01) |

(52) U.S. Cl.

CPC ........... *F21S 41/435* (2018.01); *F21S 41/143* (2018.01); *F21S 41/153* (2018.01); *F21S 41/255* (2018.01); *F21S 41/47* (2018.01); *F21S 41/65* (2018.01)

(58) Field of Classification Search

CPC ...... F21S 41/143; F21S 41/151; F21S 41/153; F21S 41/155; F21S 41/40; F21S 41/43; F21S 41/435

See application file for complete search history.

(56) References Cited

U.S. PATENT DOCUMENTS

2004/0257827 A1* 12/2004 Ishida .................. F21S 41/153 257/E33.072
2014/0146553 A1* 5/2014 Hering .................. F21S 41/153 362/509

OTHER PUBLICATIONS

Lumileds publication: "LUXEON Altilon Intense 1x1 Optical Rayset Readme", May 2018.

(Continued)

*Primary Examiner* — Sean P Gramling
(74) *Attorney, Agent, or Firm* — DICKINSON WRIGHT PLLC

(57) ABSTRACT

A lighting assembly for a vehicle headlight includes: a printed circuit board (PCB) defining a surface; a plurality of discrete LED devices disposed on the surface of the PCB and each defining an output surface, the output surfaces together defining a layout arrangement with substantially continuous illumination; a shield directly attached to the PCB and overlying the output surface of at least one discrete LED device of the plurality of discrete LED devices and to define at least one edge of a predetermined illumination pattern; and an imaging lens assembly overlying the plurality of discrete LED devices and configured to focus and direct light from the plurality of discrete LED devices to produce a lighting pattern in accordance with the predetermined illumination pattern.

4 Claims, 6 Drawing Sheets

(56) References Cited

OTHER PUBLICATIONS

Lumileds publication: "LUXEON Altilon SMD DT Optical Rayset Readme", Feb. 2019.
Lumileds brochure: "LUXEON NeoExact ADB matrix", Sep. 2021.
Lumileds brochure: "LUXEON NeoExact ADB matrix", Oct. 2022.
Lumileds brochure: "LUXEON NeoExact ADB matrix", Aug. 2023.

* cited by examiner

VEHICLE HEADLIGHT ASSEMBLY WITH PCB-MOUNTED SHIELD

CROSS REFERENCE TO RELATED APPLICATIONS

This U.S. utility patent application claims the benefit of U.S. Provisional Patent Application No. 63/543,840 filed Oct. 12, 2023 and U.S. Provisional Patent Application No. 63/557,015, filed Feb. 23, 2024, the contents of which are incorporated herein by reference in their entirety.

FIELD

The present disclosure relates generally to lighting for motor vehicles. More specifically, the present disclosure relates to headlights for passenger vehicles, such as cars and trucks.

BACKGROUND

Headlight assemblies for vehicles are subject to regulations regarding a cut-off pattern in order to illuminate a roadway ahead of the vehicle while also minimizing disruption to drivers of other vehicles, including oncoming traffic and vehicles traveling ahead of and in a same direction as the subject vehicle. Several different regulations and standards for headlight illumination may apply in different jurisdictions. Examples of such regulations and standards include ECE Created by the United Nations Economic Commission for Europe, United States Department of Transportation (DOT) for use in the U.S. & Canada, CCC certification for China, and U.S. Society of Automotive Engineers (SAE) standards.

Adaptive driving beam (ADB) headlights and systems may provide enhanced automatic control of the headlamps of a vehicle, dimming the headlights in response to a detection of light (such as headlamps of oncoming vehicles and/or taillights of leading vehicles) in the region forward of the vehicle.

SUMMARY

The present disclosure provides a lighting assembly for a vehicle headlight. The lighting assembly includes: a printed circuit board (PCB) defining a surface; a plurality of discrete LED devices disposed on the surface of the PCB and each defining an output surface, the output surfaces together defining a layout arrangement with substantially continuous illumination; a shield directly attached to the PCB and overlying the output surface of at least one discrete LED device of the plurality of discrete LED devices and to define at least one edge of a predetermined illumination pattern; and an imaging lens assembly overlying the plurality of discrete LED devices and configured to focus and direct light from the plurality of discrete LED devices to produce a lighting pattern in accordance with the predetermined illumination pattern.

The present disclosure also provides a lighting assembly for a vehicle headlight. The lighting assembly includes: a plurality of discrete LED devices, each defining an output surface having a polygon shape, the output surfaces together defining a layout arrangement with substantially continuous illumination and with a shape corresponding to a predetermined illumination pattern; a shield overlying the output surface of at least one discrete LED device of the plurality of discrete LED devices and to define at least one edge of the predetermined illumination pattern with a contoured shape; and an imaging lens assembly overlying the plurality of discrete LED devices and the shield. The imaging lens assembly is configured to focus and direct light from the plurality of discrete LED devices to produce a lighting pattern in accordance with the predetermined illumination pattern.

These and other aspects of the present disclosure are disclosed in the following detailed description of the embodiments, the appended claims, and the accompanying figures.

BRIEF DESCRIPTION OF THE DRAWINGS

Further details, features and advantages of designs of the invention result from the following description of embodiment examples in reference to the associated drawings.

DETAILED DESCRIPTION

Figure 1:
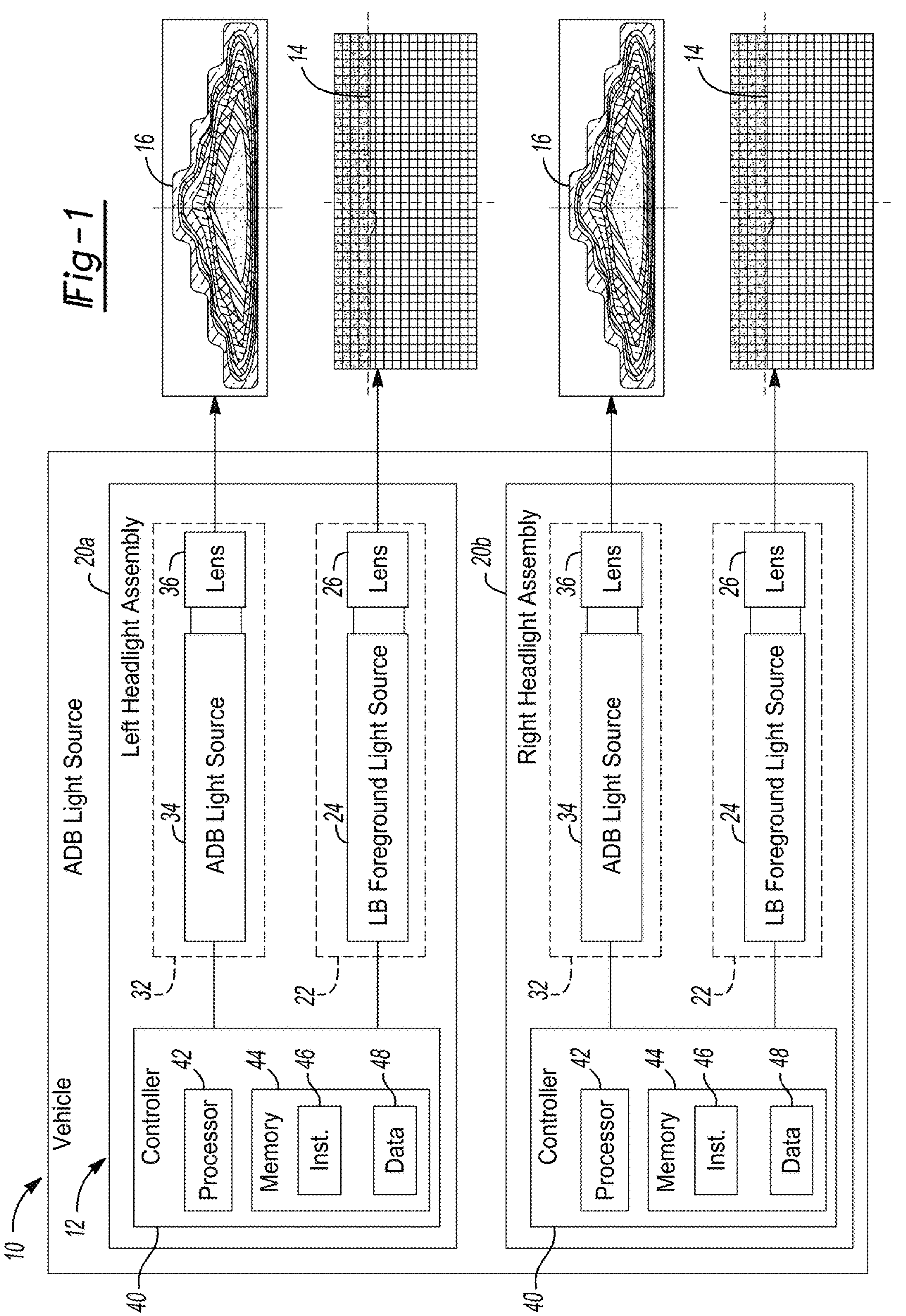
FIG. 1 shows a schematic block diagram of a vehicle with two headlight assemblies, in accordance with an aspect of the present disclosure.

Referring to the drawings, the present invention will be described in detail in view of following embodiments.

FIG. 1 shows a schematic block diagram of a vehicle 10 with a lighting system 12, according to an aspect of the present disclosure. The vehicle 10 may be a motor vehicle, such as a passenger car or truck. However, the headlamp assembly of the present disclosure may be applicable to other types of vehicles, such as commercial trucks, busses, trains, etc. The vehicle 10 with the lighting system 12 of the present disclosure may also be referred to as the ego vehicle or the subject vehicle. The lighting system 12 includes a left-side headlight assembly 20*a* and a right-side headlight assembly 20*b*. Each of the headlight assemblies 20*a*, 20*b* may be similar or identical to one-another. In some embodiments, the headlight assemblies 20*a*, 20*b* may include similar or identical internal components and different external components, such as a housing that is configured to fit within the structure on the corresponding side of the vehicle 10.

As shown in FIG. 1, each of the headlight assemblies 20*a*, 20*b* includes a low-beam light lighting assembly 22, and an adaptive driving beam (ADB) lighting assembly 32. The low-beam light lighting assembly 22 includes a low-beam light source 24, which may also be called a base light source or a foreground base light source. The low-beam light lighting assembly 22 also includes a low-beam lens 26 that overlies the low-beam light source 24 for directing light therefrom to produce a foreground lighting pattern.

The low-beam light lighting assemblies 22 of the two headlight assemblies 20*a*, 20*b* function together to produce a low-beam illumination in accordance with a first predetermined illumination pattern 14. The first predetermined illumination pattern may be determined in accordance with regulatory requirements and/or in accordance with requirements set forth by an original equipment manufacturer (OEM). For example, FIG. 1 shows the first predetermined illumination pattern 14 with an SAE pattern in accordance with North American standards. The ADB lighting assemblies 32 of the two headlight assemblies 20*a*, 20*b* function together to produce a high-beam illumination in accordance with a second predetermined illumination pattern 16. The second predetermined illumination pattern 16 may be determined in accordance with regulatory requirements and/or in accordance with requirements set forth by an original equipment manufacturer (OEM). For example, FIG. 1 shows the second predetermined illumination pattern 16 having a stepped-pyramid shape that is progressively brighter toward a center portion thereof. Each of first predetermined illumination pattern 14 and the second predetermined illumination pattern 16 may represent patterns of light at a substantial distance away from the vehicle 10, which may be called an infinite focusing distance.

The ADB lighting assembly 32 includes a first ADB light source 34 and an ADB lens assembly 36 that overlies the First ADB light source 34 and which is configured to focus and direct light therefrom to produce an ADB lighting pattern. The ADB lens assembly 36 may include an imaging lens assembly that is arranged to produce the ADB lighting pattern in accordance with a predetermined illumination pattern that is generated by the ADB light source.

Each of the headlight assemblies 20*a*, 20*b* also includes a controller 40 in communication with each of the low-beam light source 24, and the first ADB light source 34. The controller 40 may also be called a headlamp smart lighting driver or a headlamp smart LED driver. The controller 40 may be configured to control a pattern of light generated by the first ADB light source 34. In some embodiments, the controller 40 may control operation of the low-beam light source 24. For example, the controller 40 may provide an on/off signal to a switching device to control the low-beam light source 24. Alternatively or additionally, the controller 40 may control a brightness level of the low-beam light source 24. In some embodiments, the controller 40 may control a light distribution output of the first ADB light source 34, such as a beam pattern generated by the first ADB light source 34.

The controller 40 includes a processor 42 coupled to a storage memory 44. The storage memory 44 includes instruction storage 46 storing instructions, such as program code for execution by the processor 42. The storage memory 44 also includes data storage 48 for holding data for use by the processor 42.

Figure 2:
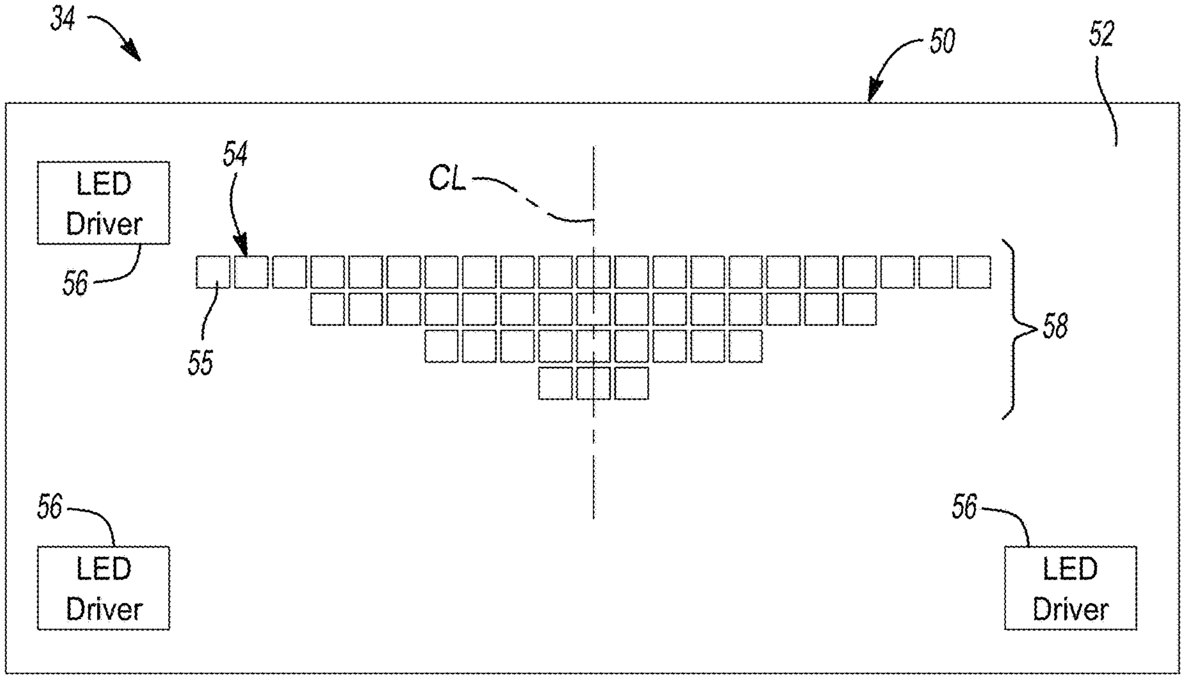
FIG. 2 shows a front view of an ADB light source, in accordance with an aspect of the present disclosure.

FIG. 2 shows a front view of a first ADB light source 34. The First ADB light source 34 includes a printed circuit board (PCB) 50 that defines a surface 52. The First ADB light source 34 also includes a plurality of discrete LED devices 54 disposed on the surface 52 of the PCB 50. Each of the discrete LED devices 54 defines an output surface 55 having a polygon shape. The output surfaces 55 of the discrete LED devices 54 shown on FIG. 2 each have a square shape. However, some or all of the discrete LED devices 54 may have an output surface 55 with a different polygon shape, such as a triangle, rectangle, hexagon, octagon, etc.

The output surfaces 55, together, define a layout arrangement 58 with substantially continuous illumination and with a shape that corresponds to the predetermined illumination pattern. For example, as shown in FIG. 2, the First ADB light source 34 includes forty-eight (48) of the discrete LED devices 54 arranged in four (4) rows, each having a different number of the discrete LED devices 54. The plurality of discrete LED devices 54 substantially fill the layout arrangement 58. However, the discrete LED devices 54 are spaced apart by a small distance, such as 25-70 microns, to define gaps between adjacent ones of the output surfaces 55.

For simplicity of illustration, only one of the discrete LED devices 54 shown on FIG. 2 is labeled with reference numbers. The layout arrangement 58 defines a triangular pattern, with a top row having several of the discrete LED devices 54 arranged symmetrically about a center line CL, and with three additional rows each arranged symmetrically about the center line and each having progressively fewer of the of the discrete LED devices 54. The layout arrangement 58 includes rows having twenty-one (21), fifteen (15), nine (9), and three (3) of the discrete LED devices 54, respectively.

Each of the discrete LED devices 54 may be individually controllable to produce an intensity of light in accordance with the predetermined illumination pattern. For example, the ADB lighting assembly 32 may be operated with each of the discrete LED devices 54 having a first predetermined brightness level, with different ones of the discrete LED devices 54 operated to produce different intensities of light in order to generate the second predetermined illumination pattern 16. Each of the discrete LED devices 54 may also be individually controllable to operate in a reduced intensity mode to produce a dimmed region of the lighting pattern. For example, a group of one or more of the discrete LED devices 54 may be operated in the reduced intensity mode to produce a dimmed region corresponding to a direction of oncoming traffic in order to reduce the intensity of light being directed toward that oncoming traffic.

The layout arrangement 58 may be inverted relative to the predetermined illumination pattern. For example, the layout arrangement 58 may include the triangular pattern with a flat top and progressively narrowing to a smallest width at a bottom row, which may be inverted by the ADB lens assembly 36 to produce the predetermined illumination pattern with a flat bottom, narrowing to a smallest width at the top.

The First ADB light source 34 also includes three LED drivers 56 mounted on the surface 52 of the PCB 50, with each of the LED drivers 56 configured to supply power to sixteen (16) of the discrete LED devices 54. Thus, the three (3) LED drivers 56 may be fully utilized for powering the forty-eight (48) of the discrete LED devices 54.

Figure 3:
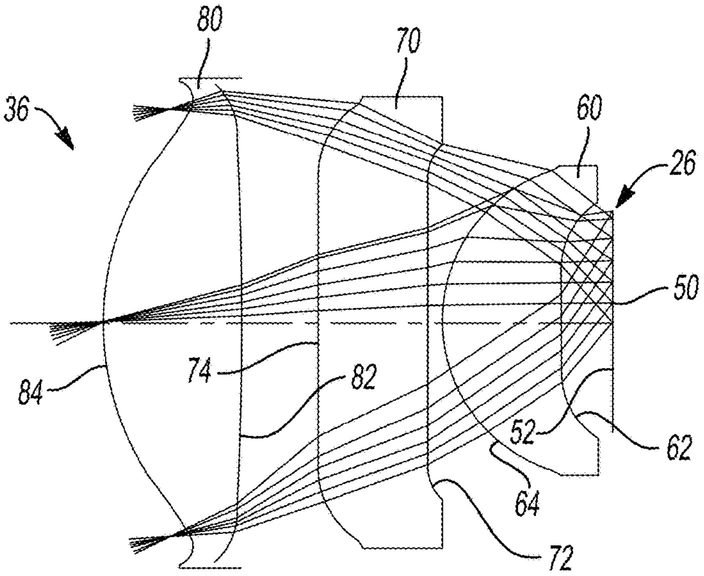
FIG. 3 shows a cross-sectional side view of an imaging lens assembly of an ADB lighting assembly, in accordance with an aspect of the present disclosure.

FIG. 3 shows a cross-sectional side view of the ADB lens assembly 36. The ADB lens assembly 36 may modify a pattern of light produced by the first ADB light source 34, such as by stretching the pattern and/or by blending some amount of light between the adjacent ones of the discrete LED devices 54 to fill portions of the lighting pattern corresponding to the gaps and to thereby cause the outputted pattern to appear smooth and unaffected by the gaps. However, the ADB lens assembly 36 may be configured to produce the second predetermined illumination pattern 16 with a shape that is substantially determined by the layout arrangement 58 of the discrete LED devices 54 on the surface 52 of the PCB 50.

As shown in FIG. 3, the ADB lens assembly 36 includes a first lens element 60 adjacent to the PCB 50. The first lens element 60 defines a first input surface 62 receiving light from the discrete LED devices 54. The first lens element 60 also defines and a first output surface 64 for outputting light. The ADB lens assembly 36 also includes a second lens element 70 overlying the first lens element 60, with the first lens element 60 disposed between the second lens element 70 and the PCB 50. The second lens element 70 defines a second input surface 72 receiving light from the first output surface 64 of the first lens element 60. The second lens element 70 also defines a second output surface 74 for outputting light. As shown, the first input surface 62 and the second input surface 72 each have a concave shape, and the first output surface 64 and the second output surface 74 each have a convex shape. However, either or both of the first lens element 60 and/or the second lens element 70 may have a different shape.

The ADB lens assembly 36 also includes a third lens element 80 overlying the second lens element 70, with the second lens element 70 disposed between the third lens element 80 and the first lens element 60. The third lens element 80 defines a third input surface 82 receiving light from the second output surface 74 of the second lens element 70. The third lens element 80 also defines a third output surface 84 for outputting light. As shown, the third input surface 82 and the third output surface 84 each have a convex shape. However, either or both of the third input surface 82 and the third output surface 84 may have a different shape.

In some embodiments, each of the lens elements 60,70,80 have at least one aspheric lensing surface. For example, some or all of the input surfaces 62, 72, 82 and/or some or all of the output surfaces 64, 74, 84 may be aspheric.

In some embodiments, at least two of the lens elements 60, 70, 80 are made of different materials, which may aid in reducing or preventing color separation of the light passing therethrough. In some embodiments, all three of the lens elements 60, 70, 80 are made of different materials. For example, the first lens element 60 may be made of glass, and the second lens element 70 and the third lens element 80 may each be made of different types of polymer material, such as polycarbonate (PC) and/or Poly(methyl methacrylate) (PMMA), also called acrylic. Glass material may enable the first lens element 60 to withstand relatively high temperatures produced by operation of the discrete LED devices 54 and the LED drivers 56. In some embodiments, the second lens element 70 may be made of polycarbonate (PC), and the third lens element 80 may be made of PMMA.

Figure 4:
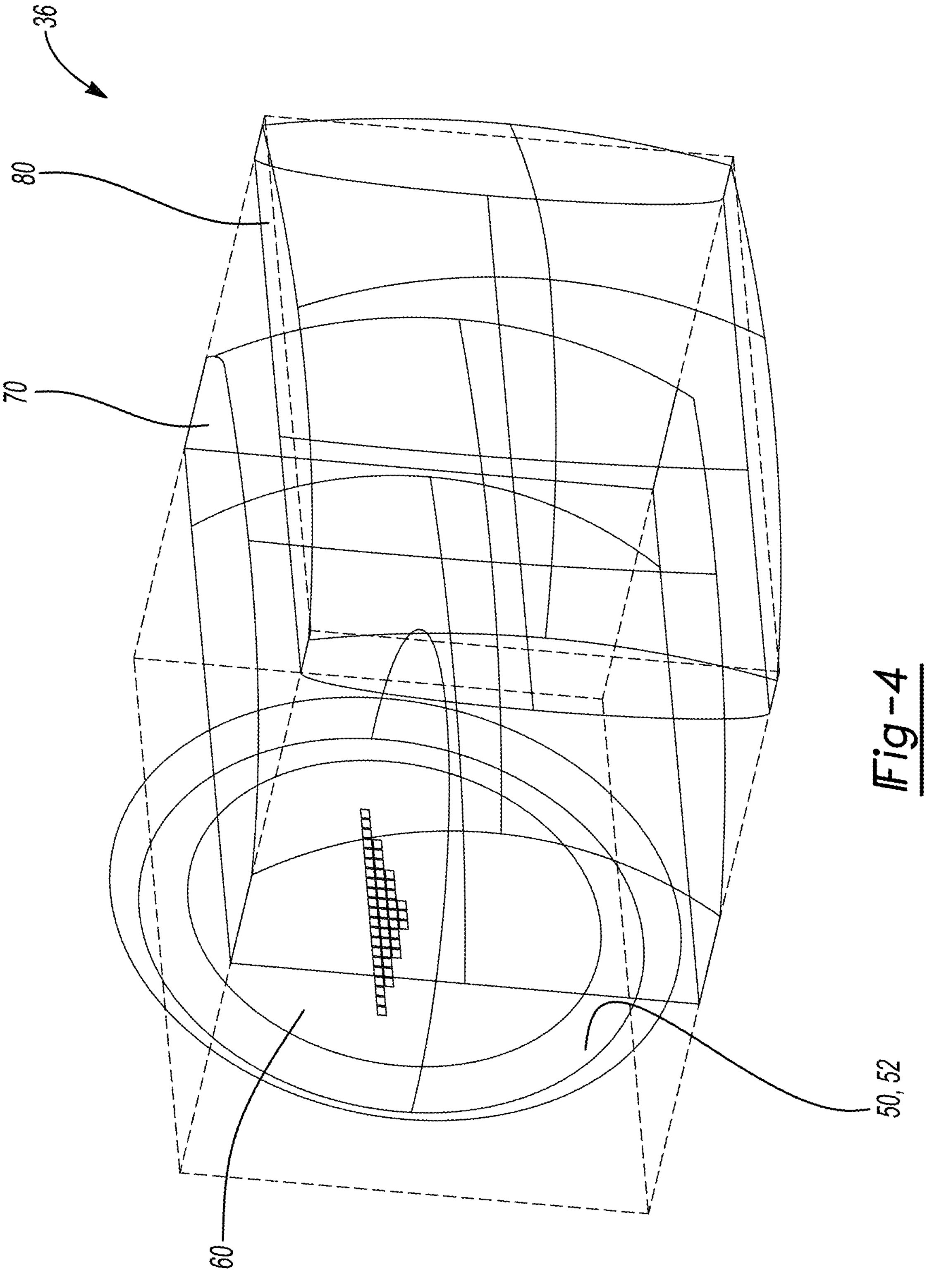
FIG. 4 shows a perspective wire-frame view of an ADB lens assembly in accordance with an aspect of the present disclosure.

FIG. 4 shows a perspective wire-frame view of the ADB lens assembly 36. As shown, each of the lens elements 60, 70, 80 are truncated to define a rectangular shape as viewed from a front, facing toward the surface 52 of the PCB 50. The rectangular shape may provide advantageous for packaging the ADB lens assembly 36 in the vehicle 10. Alternatively or additionally, the rectangular shape of the ADB lens assembly 36 may provide a particular desired aesthetic design.

Figure 5:
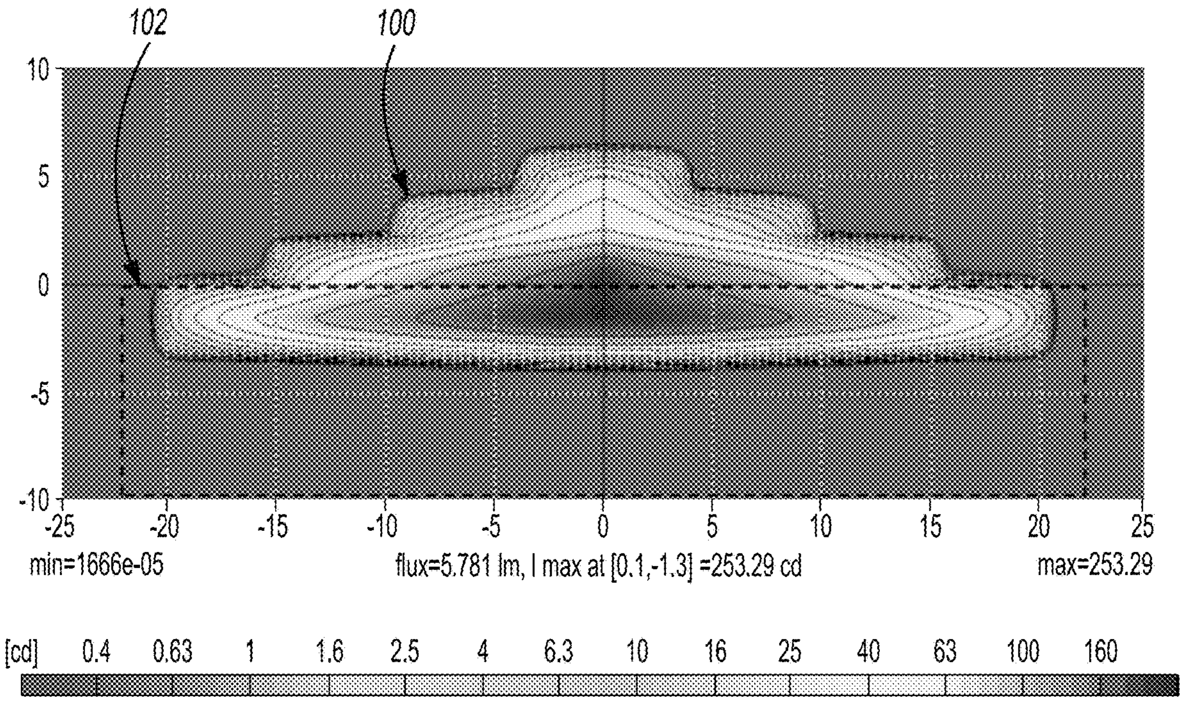
FIG. 5 shows a combined projection pattern in accordance with an aspect of the present disclosure, including both an ADB lighting pattern and a foreground lighting pattern.

FIG. 5 shows a combined projection pattern in accordance with an aspect of the present disclosure, including both a first ADB lighting pattern 100 and a low-beam lighting pattern 102, which may also be called a foreground pattern. The first ADB lighting pattern 100 extends below a horizon to overlap the low-beam lighting pattern 102.

Figure 6:
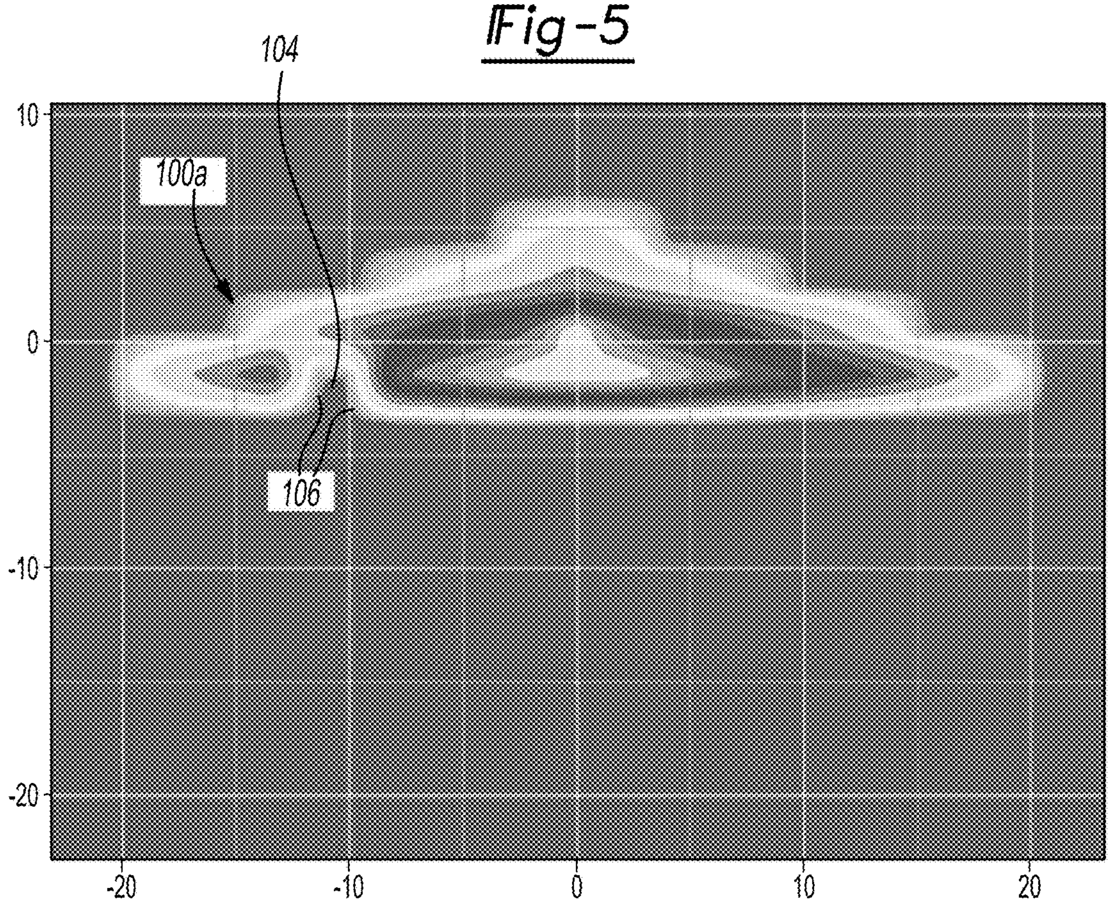
FIG. 6 shows an ADB lighting pattern including a dimmed region, in accordance with an aspect of the present disclosure.

FIG. 6 shows a second ADB lighting pattern 100*a* including a dimmed region 104 that is produced by operating two vertically-adjacent ones of the plurality of discrete LED devices 54 in the reduced intensity mode produces the dimmed region 104 having light intensity meeting an intensity threshold for low-beam illumination. The dimmed region 104 is bounded on either side by a transition area 106 that gets progressively brighter to a light intensity meeting an intensity threshold for high-beam illumination, outside of the dimmed region 104. The dimmed region 104 may be expanded to a larger size by increasing a number of the discrete LED devices 54 that are operated in the reduced intensity mode, for example, to provide a larger dimmed region 104 as an oncoming vehicle moves closer to the lighting system 12, filling a larger portion of a field of view. In some embodiments, the transition area 106 may have a width that does not exceed 1.0-degree.

Figure 7:
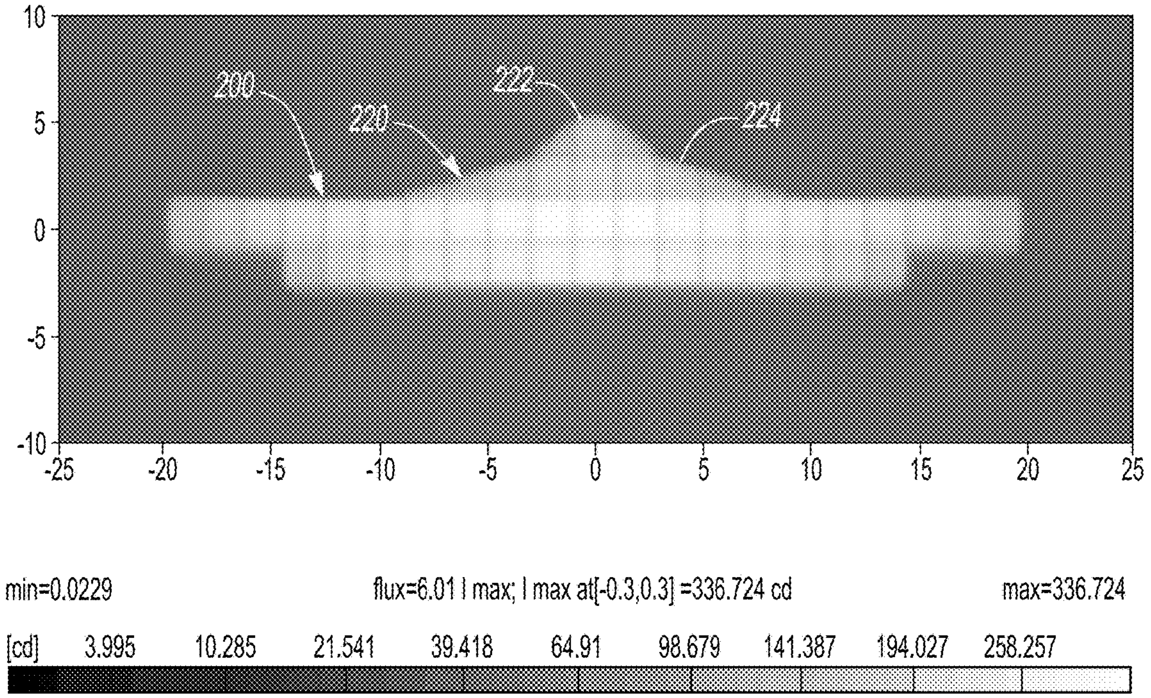
FIG. 7 shows an ADB lighting pattern with a top edge defining a cutoff pattern with a gradual curved shape, in accordance with an aspect of the present disclosure.

FIG. 7 shows a third ADB lighting pattern 200 that includes a top edge 220 defining a cutoff pattern with a contoured shape, in accordance with an aspect of the present disclosure. The third ADB lighting pattern 200 may be similar or identical to the first ADB lighting pattern 100 and/or the second ADB lighting pattern 100*a*, except with the top edge 220 having a contoured shape with a gradual curve, instead of the stair-stepped pattern visible on the first ADB lighting pattern 100 and the second ADB lighting pattern 100*a*. The top edge 220 defines a bulbous center 222 with a hemispherical or parabolic shape. The top edge 220 also defines ramp portion 224 on either side of the bulbous center 222 and having defining a continuous cutoff line that extends upwardly toward the bulbous center 222. It should be appreciated that the third ADB lighting pattern 200 shown on FIG. 7 is merely an example, and the principles of the present disclosure may be used to generate lighting cutoff patterns with a different size and/or shape, and which may depend on a given implementation or design.

Figure 8A:
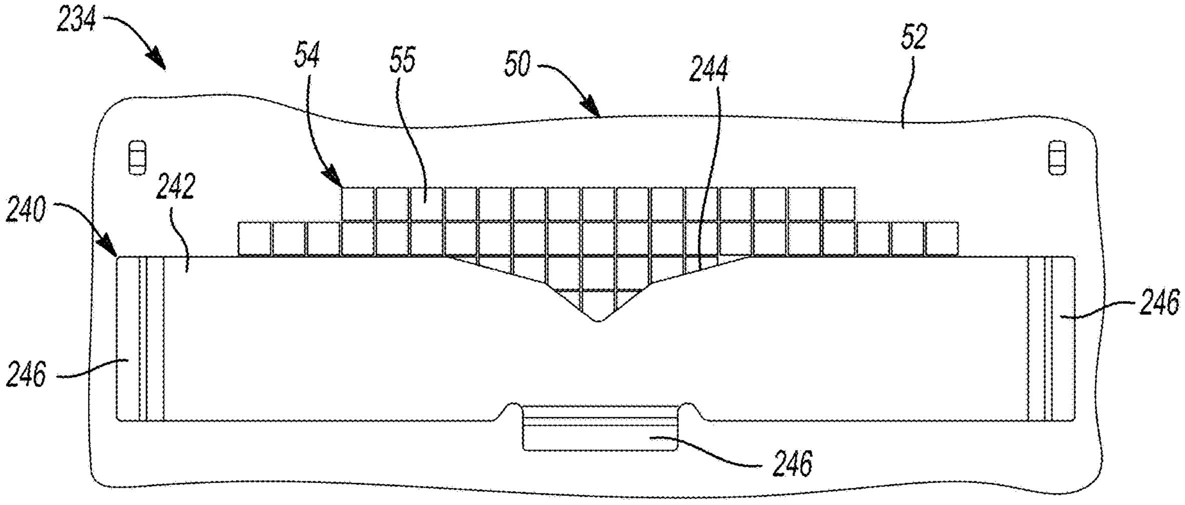
FIGS. 8A-8B show a second ADB light source, in accordance with an aspect of the present disclosure.
Figure 8B:
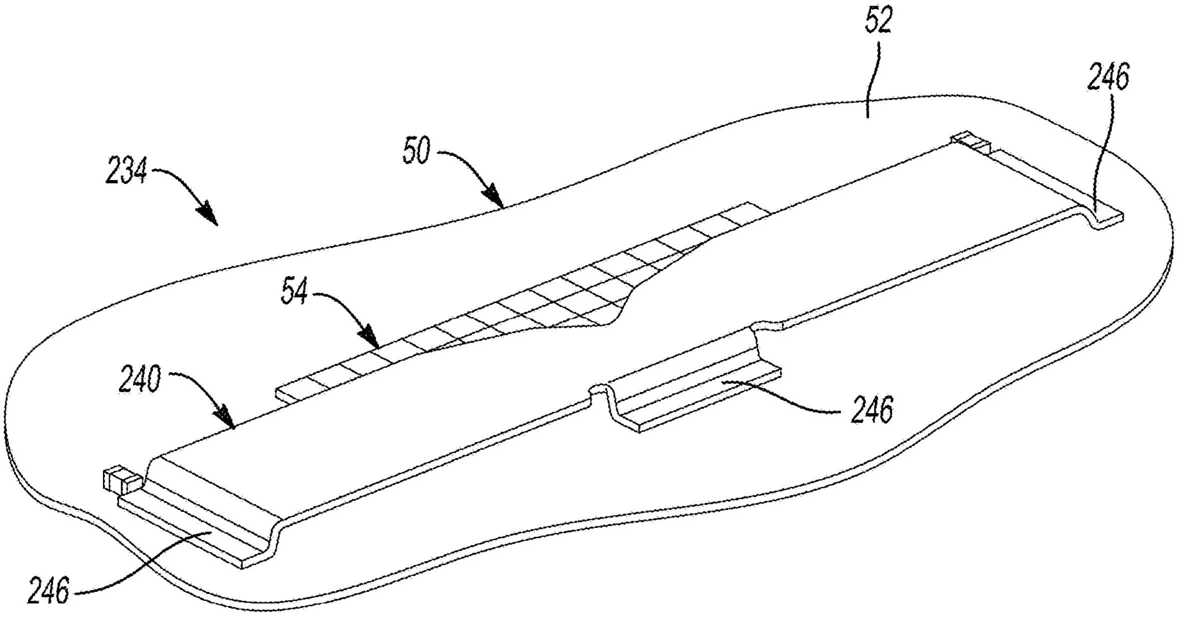

FIGS. 8A-8B show a second ADB light source 234, in accordance with an aspect of the present disclosure. The second ADB light source 234 may be similar or identical to the first ADB light source 34, except for the features described herein. The second ADB light source 234 includes a shield 240 that is directly attached to the surface 52 of the PCB 50 and overlying the output surfaces 55 of some of the discrete LED devices 54. More specifically, the shield 240 includes a planar portion 242 that overlies, at least partially, one or more of the discrete LED devices 54 on a bottom row that corresponds to a top portion of the predetermined illumination pattern. Thus, the shield 240 functions to define an upper edge of the predetermined illumination pattern with a contoured shape. The contoured shape may be different from a stair-step pattern that may otherwise be caused by the rows having different numbers of the discrete LED devices 54, and which form the upper edge of the predetermined illumination pattern. For example, the shield 240 may be configured to define the third ADB lighting pattern 200 shown in FIG. 7.

The second ADB light source 234 includes the shield 240 configured to define the contoured upper edge, in combination with a relatively low number of discrete LED devices 54. This combination may provide a lighting effect with one or more smooth contoured edges, and without rough or jagged edges that may otherwise be created by a relatively low number of discrete LED devices 54. This combination may provide a significant cost savings over alternative designs that may require substantially more and/or smaller LED devices to achieve a similar contoured edge.

The shield 240 may be made of metal, such as stainless steel or aluminum, although other types of materials may be used. In some embodiments, the shield 240 may be non-reflective on either or both of a back surface that faces toward the discrete LED devices 54 and/or a front surface that faces outwardly, away from the discrete LED devices 54. In some embodiments, the shield 240 may reflect no more than 10% of incident light. In some embodiments, the shield 240 may reflect no more than 5% of incident light. In some embodiments, the shield 240 may have a non-reflective coating, such as paint, a powder coating, and/or an anodized layer. In some embodiments, the shield 240 may be made of aluminum that is anodized to be non-reflective. In some embodiments, a sheet of anodized aluminum may be used to form the shield 240. For example, pre-anodized aluminum may be stamped and bent to form the shield 240. However, other techniques may be used in making the shield 240, such as anodizing and/or other coating applied to a metal substrate before or after the metal is formed to shape the shield 240.

The shield 240 is configured as a surface-mount device (SMD) that is attached to the surface 52 of the PCB 50 by soldering. However, the shield 240 may have a different configuration and be attached to the PCB 50 by other means, such as by clips or pins that pass through the PCB or engage an edge thereof. In some embodiments, and as shown in FIGS. 8A-8B, the shield 240 includes a plurality of feet 246 that extend perpendicularly to the planar portion 242 and are configured for connection to the surface 52 of the PCB 50. The feet 246 may function to secure the shield 240 in position, with the planar portion 242 parallel to and spaced apart from the output surface 55 of the at least one discrete LED device 54 overlaid by the shield 240. The shield 240 spaced apart from the output surface 55 of the at least one discrete LED device 54 by a distance of less than 1.0 millimeter. For example, the planar portion 242 may be spaced apart from the discrete LED devices 54 by about 0.5 millimeter. The planar portion 242 should maintain separation from the discrete LED devices 54 to prevent contact, which could otherwise create vibration and premature wear. However, the planar portion 242 are advantageously positioned relatively closely to the output surfaces 55 of the discrete LED devices 54 so as to clearly define the top edge 220 of the third ADB lighting pattern 200.

Figure 9:
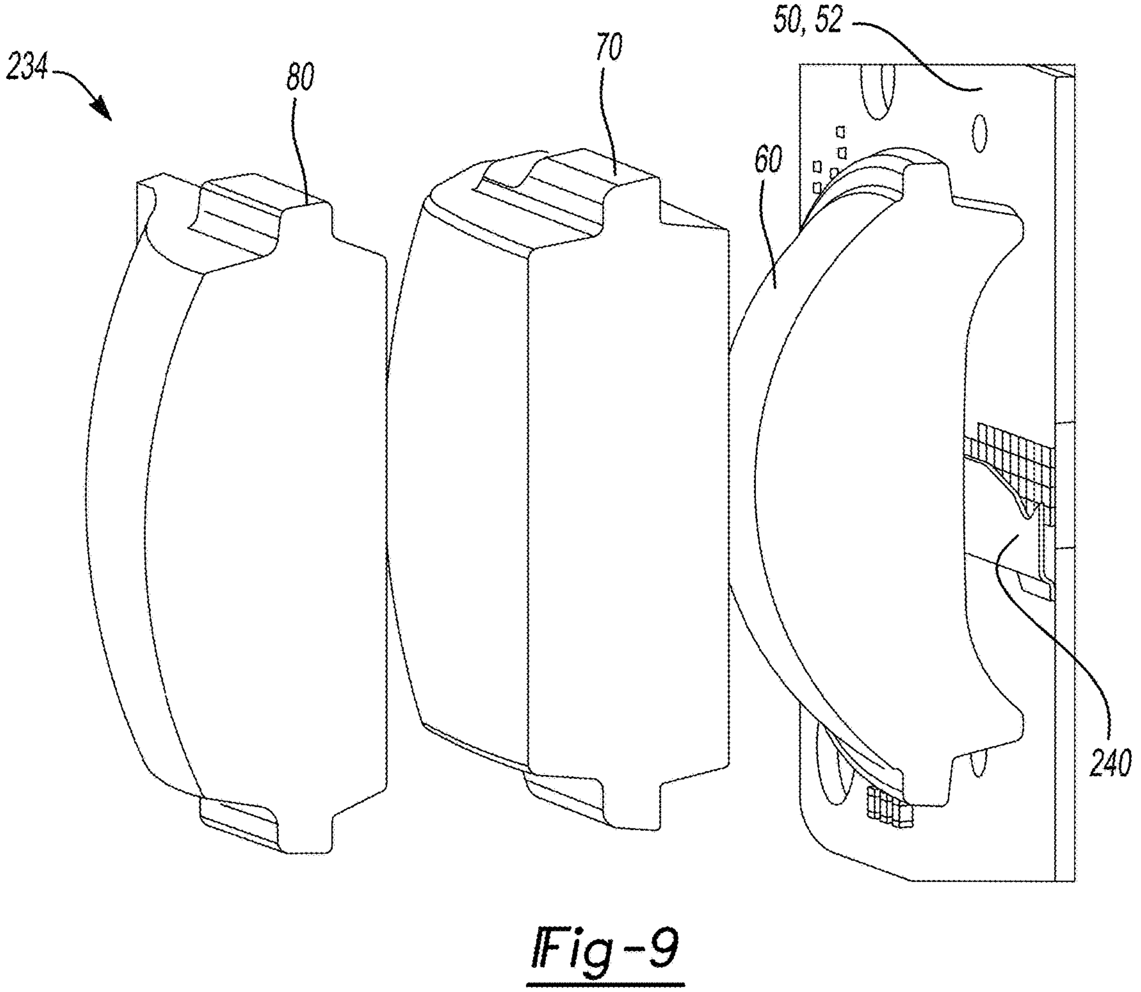
FIG. 9 shows a perspective cut-away view of the second ADB light source, in accordance with an aspect of the present disclosure.

FIG. 9 shows a perspective cut-away view of the second ADB light source 234, with the lens elements 60,70,80 overlying the plurality of discrete LED devices 54 on the PCB 50. The lens elements 60,70,80 may, together, form an imaging lens assembly and which defines a focal plane that is substantially coplanar with the output surfaces of the plurality of discrete LED devices 54.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting assembly for a vehicle headlight, comprising:

a printed circuit board (PCB) defining a planar surface having a flat planar shape;

a plurality of discrete LED devices disposed on the planar surface of the PCB and each defining an output surface, the output surfaces together defining a layout arrangement with substantially continuous illumination;

a shield contacting and directly attached to the planar surface of the PCB and overlying the output surface of at least one discrete LED device of the plurality of discrete LED devices and to define at least one edge of a predetermined illumination pattern; and an imaging lens assembly overlying the plurality of discrete LED devices and configured to focus and direct light from the plurality of discrete LED devices to produce a lighting pattern in accordance with the predetermined illumination pattern;

wherein the shield includes a planar portion with a flat shape that overlies the at least one discrete LED device, and wherein the shield includes a plurality of feet that extend perpendicularly to the planar portion and are configured for connection to the planar surface of the PCB.

2. A lighting assembly for a vehicle headlight, comprising:

a plurality of discrete LED devices, each defining an output surface having a polygon shape, the output surfaces together defining a layout arrangement with substantially continuous illumination and with a shape corresponding to a predetermined illumination pattern;

a printed circuit board (PCB) defining a planar surface, wherein the plurality of discrete LED devices are each disposed on the planar surface of the PCB;

a shield directly attached to the PCB and overlying the output surface of at least one discrete LED device of the plurality of discrete LED devices and to define at least one edge of the predetermined illumination pattern with a contoured shape, wherein the shield adjoins the planar surface of the PCB; and an imaging lens assembly overlying the plurality of discrete LED devices and the shield, wherein the imaging lens assembly is configured to focus and direct light from the plurality of discrete LED devices to produce a lighting pattern in accordance with the predetermined illumination pattern, wherein the shield includes a planar portion with a flat shape that overlies the at least one discrete LED device, and wherein the shield includes a plurality of feet that extend perpendicularly to the planar portion and are configured for connection to the planar surface of the PCB.

3. The lighting assembly of claim 2, wherein each of the discrete LED devices are individually controllable to produce an intensity of light in accordance with the predetermined illumination pattern and to operate in a reduced intensity mode to produce a dimmed region of the lighting pattern.

4. The lighting assembly of claim 2, wherein the shield is configured as a surface-mount device (SMD) that is directly attached to the planar surface of the PCB by soldering.

* * * * *